Oct. 7, 1941. J. G. MATHE ET AL 2,258,119
ADJUSTABLE SEAT STRUCTURE FOR MOTOR VEHICLES AND THE LIKE
Filed March 1, 1938 3 Sheets-Sheet 1

Inventors:-
Juan G. Mathe
George W. Hipsley
by their Attorneys
Howson & Howson

Oct. 7, 1941.   J. G. MATHE ET AL   2,258,119
ADJUSTABLE SEAT STRUCTURE FOR MOTOR VEHICLES AND THE LIKE
Filed March 1, 1938   3 Sheets-Sheet 2

Inventors:-
Juan G. Mathe
George W. Hipsley
by their Attorneys
Howson & Howson

Oct. 7, 1941.   J. G. MATHÉ ET AL   2,258,119
ADJUSTABLE SEAT STRUCTURE FOR MOTOR VEHICLES AND THE LIKE
Filed March 1, 1938   3 Sheets-Sheet 3
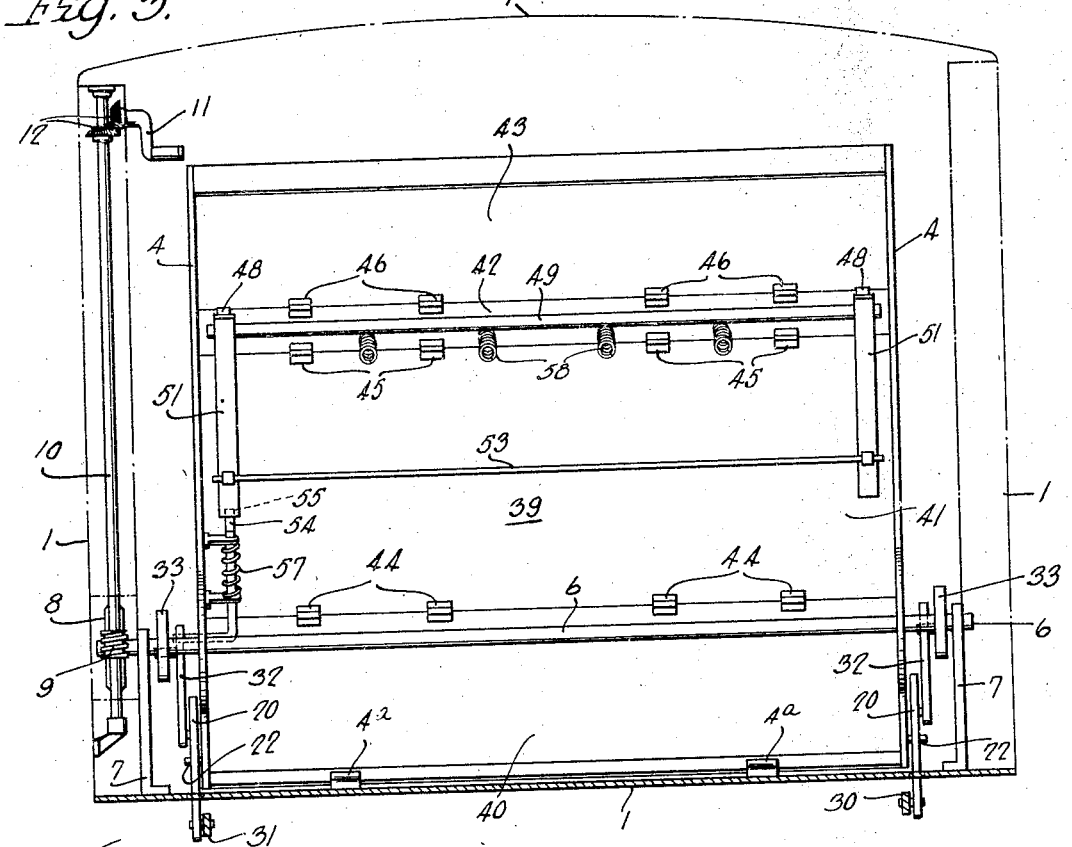
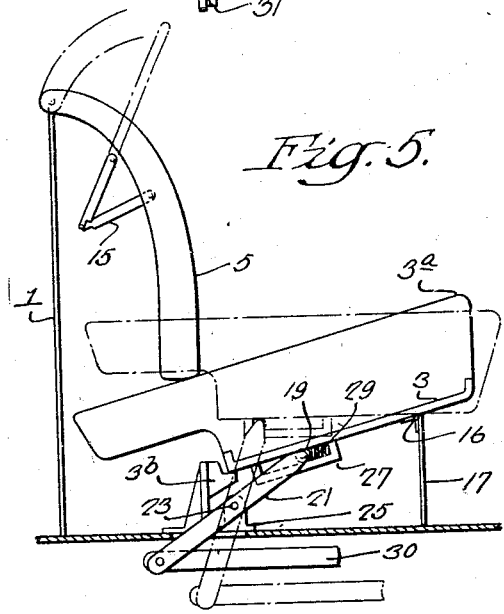
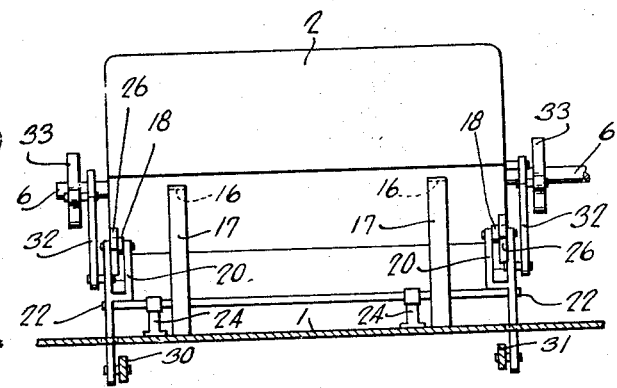
Inventors:—
Juan G. Mathe
George W. Hipsley
by their Attorneys
Howson & Howson Patented Oct. 7, 1941

2,258,119

UNITED STATES PATENT OFFICE 2,258,119

ADJUSTABLE SEAT STRUCTURE FOR MOTOR VEHICLES AND THE LIKE

Juan G. Mathé and George W. Hipsley, San Salvador, El Salvador

Application March 1, 1938, Serial No. 193,330

8 Claims. (Cl. 155—7)

This invention relates to new and useful improvements in automobiles of the passenger carrying type and the principal object of the invention is to provide certain improvements in the construction and arrangement of the front and rear seats of an automobile to the end that said seats may readily be adjusted to horizontal position forming a bed.

Another object of the invention is to provide a front seat construction for automobiles whereby said seat may readily be adjusted to a plurality of intermediate reclining positions, and a further object of said invention is to provide a novel front seat construction for automobiles wherein the forward surface of the back rest thereof is automatically controlled upon adjustment of the position thereof to the end that said surface will be provided with a curvature when in upright position and be substantially flat or plane when in horizontal bed forming position.

A still further object of the invention is to provide a front and rear seat construction and arrangement which is of relatively simple construction, and comparatively easy to operate or adjust.

These and other objects of the invention, as well as the features and details of its construction and operation are hereinafter fully set forth and illustrated in the accompanying drawings, in which:

Figure 3 is a view in section taken on line 3—3, Figure 1;

Figure 4 is a fragmentary view taken on line 4—4, Figure 1; and

Figure 5 is a fragmentary view in elevation illustrating a modification of a part of the invention.

Figure 1:
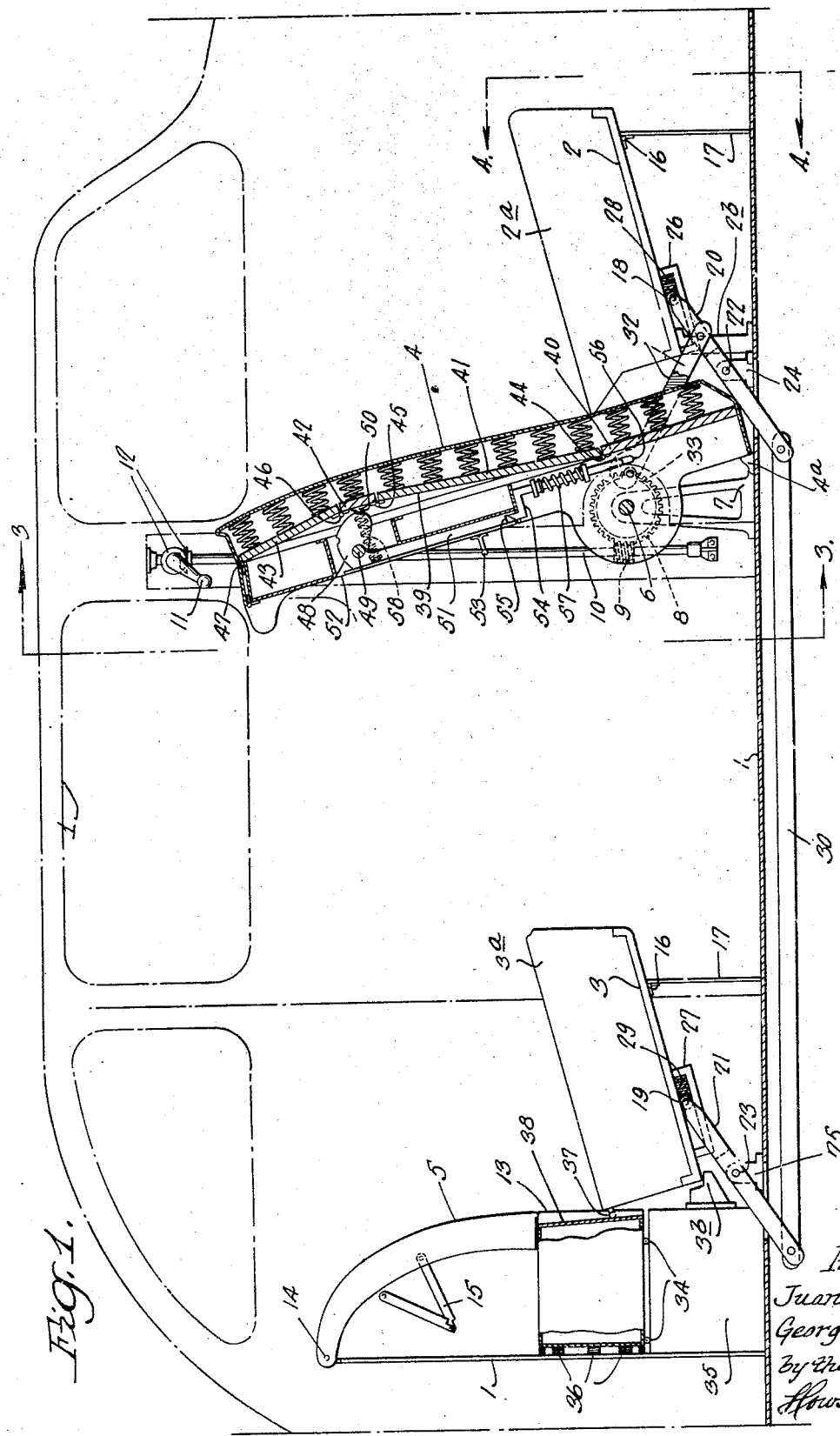
Figure 1 is a side elevation view partly in section of the front and rear seats of an automobile in normal position constructed according to the present invention.

Referring now more particularly to the drawings, an automobile body 1 of any well known construction and type is provided with front and rear seat frames 2 and 3 in which are fitted seats 2a and 3a having associated therewith back rests 4 and 5 respectively. As shown, the back rest 4 of the front seat is secured upon a shaft 6 which is rotatably supported transversely of the automobile body 1 in standards 7 and a worm wheel 8 is secured adjacent one end of said shaft 6 for meshing engagement with a worm 9 carried at the lower end of a vertically arranged rotatable shaft 10. The worm 9 and shaft 10 are preferably concealed within the jamb or the body structure between the left hand front and rear doors of the automobile while the worm wheel 8 is preferably contained within a suitable housing or casing recessed partly in said jamb and arranged to reside in a recess provided in the front door when the latter is closed. A suitable crank or handle 11 projects inwardly of the vehicle body and is connected at or near the upper end of the shaft 10 through bevel gears 12 for the purpose of enabling the shaft 10 and in turn the shaft 6 to be rotated to adjust the back rest 4 between the position shown in Figure 1 limited or determined by a stop 4a and the position shown in Figure 2.

Figure 2:
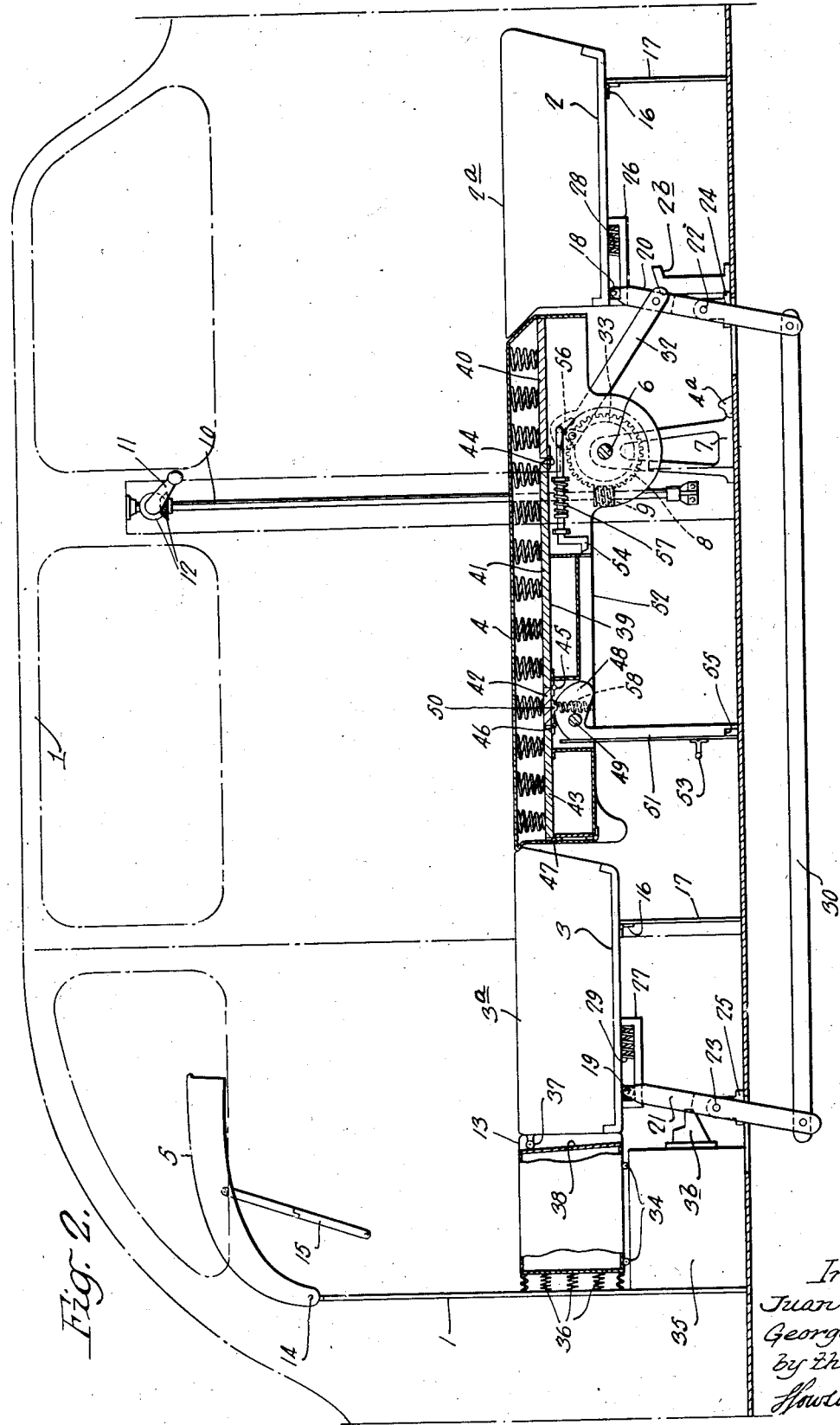
Figure 2 is a view similar to Figure 1 showing the seats adjusted or transformed into a bed.

On the other hand, the back rest 5 in its lowered or normal position rests upon the upper surface of a member 13, and has its upper end hinged or pivoted at 14 to the rear wall of the body 1 of the vehicle to permit it to be swung upwardly into the position shown in Figure 2, a breakable link connection 15 being provided and connected between said back rest 5 and said vehicle body for the purpose of supporting the former in said elevated position. The space rearwardly of the back 5 thus considerably lengthens the space available for sleeping purposes when said back 5 is raised, and when lowered provides a place for the storage of bedding or other objects.

As shown in the drawings, the front and rear frames 2 and 3 are hinged, as indicated at 16, adjacent their forward ends to upright elements 17 secured to the floor of the vehicle body 1 and the rear ends of said seat frames 2 and 3 are adjustably supported upon rollers 18 and 19 respectively carried in the upper yoked ends of pairs of links 20 and 21 which are pivoted, as indicated at 22 and 23, to brackets 24 and 25 secured to the floor of the vehicle body 1, downward movement of said seat frames being limited by stops 2b and 3b respectively. As shown, the rollers 18 and 19 are respectively mounted and arranged to travel in brackets 26 and 27 secured at the under side of the seat frames 2 and 3 and springs 28 and 29 are mounted in the forward portions of said brackets for engagement by the rollers 18 and 19 when said seat frames are in normal position to create a tension on all of the loose parts thus preventing rattling thereof when the vehicle is in motion.

The lower ends of the pairs of links 20 and 21 extend or project below the floor of the vehicle body 1 and are respectively connected together for simultaneous movement by means of links or rods 30 and 31. In order that the seats 2a and 3a may be pivoted or moved upwardly into horizontal position as the front seat back rest 4 is actuated downwardly into a horizontal position between said seats, the pair of links 20 are operatively connected by means of links 32 to discs 33 fixed on the shaft 6 so that upon rotation or pivoting of the back rest 4 in a counterclockwise direction with respect to the drawing, the seat frames 2 and 3 will be actuated in a clockwise direction with respect to the drawings to the position shown in Figure 2 and vice versa.

As illustrated, the member 13, previously mentioned herein, is mounted upon rollers 34 for movement upon the structure 35 longitudinally of the vehicle body 1 and coil springs 36 are interposed between the said member 13 and the rear wall of said body tending to urge the member 13 forwardly of the vehicle. Relative movement of the seat 3a and its frame 3 vertically with respect to the member 13 is facilitated by rollers 37 mounted near the upper end of the rear face of said seat 3a and adapted to ride upon tracks 38 arranged inwardly of the forward face of said member 13. The tracks 38 as shown incline slightly rearwardly so that as the seat 3a moves into the position shown in Figure 2, the member 13 may move forwardly under the influence of the springs 36, to close the space that would otherwise exist between said member 13 and the adjacent face of the seat 3a when in adjusted position. In lieu of this particular construction an arrangement such as that shown in Figure 5 may be employed wherein the rear seat 3a is provided with an extension or projecting portion movable, together with said rear seat, into a horizontal position as shown in dotted lines by means of the links 21 and 30 which are operatively connected by the links 20 and 32 to the actuating mechanism as previously described.

In order that the spring cushioned forward surface of the back rest 4 may be adjustable to provide a truly horizontal or plane surface when in the position shown in Figure 2 thus affording maximum comfort for sleeping, and a curved surface or contour affording maximum comfort when in the normal upright or sitting position shown in Figure 1, the inner spring supporting frame 39 thereof is composed of a plurality of sections, 40, 41, 42 and 43 respectively hinged together as indicated at 44, 45, 46 and 47 to afford a relatively flexible structure.

Adjustment of the contour of the spring cushioned forward surface of the back rest 4, in the present instance, is effected by means of cams 48 secured in spaced relation upon a shaft 49 rotatably mounted transversely of said back rest, said cams 48 being arranged so that their peripheries are engaged by cam rollers 50 mounted rearwardly of the hinged section 42. Associated and movable with each cam 48 is an arm or lever 51 which extends substantially at right angles to the long axis of said cams and, in the normal position of the back rest 4, is adapted to lie parallel to and inwardly of the rear wall 52 of said back rest 4 as shown in Figure 1 of the drawings with the result that the cams distort or flex the frame sections forwardly to provide a curvature in the forward cushioned surface of the back rest member.

The cams 48 and their levers 51 are connected together for simultaneous movement by means of a rod 53 and are normally held in the above mentioned frame flexing relationship by means of a latch member 54 one end of which is arranged to engage a notch 55 in the extremity of one of said levers 51 and has its other end slidably engaging the adjacent link 32 through a slot 56 provided therein. A spring 57 is mounted upon the latch member 54 and operates in normal position of the back rest 4 to retain said latch member in engagement with the notch 55 in said lever 51 as shown in Figure 1 of the drawings.

The cams 48 distort or flex the frame sections 41, 42 and 43 forwardly against the action of a plurality of tension springs 58, and the cam rollers 50 are arranged so that in said flexed position of said sections they contact said cams 48 slightly off center with the result that upon release of the latch member 54 upon adjustment of the back rest 4 into the position shown in Figure 2, the springs 58 acting through said cam rollers 50 force the cams 48 in a clockwise direction and move the levers 51 associated therewith in a like direction outwardly of the back rest 4.

Accordingly, as the back rest 4 moves into horizontal position, the cam levers 51 assume a substantially vertical position supporting the free end of said back rest 4 in the manner shown and at the same time pressure of the cams 48 upon the sections 41, 42 and 43 of the frame is released with the result that the springs 58 draw or pull said sections into a plane relationship providing a flat horizontal surface to the back rest 4 which affords maximum comfort for sleeping or rest purposes. As the back rest 4 is returned to its normal upright position against the stop 4a the said cam levers 51 may be manually forced into the position shown in Figure 1 of the drawings, and into engagement with the latch member 54, thus causing the cams 48 to again forwardly flex or distort the frame sections 41, 42 and 43 against the tension of springs 58 to provide the desired curvature to the surface thereof, the rod 53 being utilized as a handle for this purpose.

In addition to the two terminal positions of the back rest 4, said back rest may be adjusted by means of the handle 11 and associated mechanism to any desired angular or reclining position therebetween and while one particular embodiment of the invention has been herein illustrated and described, it is not intended that said invention shall be limited to such disclosure but that changes and modifications may be incorporated and embodied therein within the scope of the annexed claims.

We claim:

1. In a passenger vehicle, normally rearwardly declining front and rear seats, a pivotal mounting for each of said seats whereby the seats are movable from their normal positions to horizontal positions and vice versa, a back rest for the front seat constructed and arranged so that the surface thereof may assume either a curved contour or a flat condition, a first means for urging the surface of the back rest to assume its flat condition when said back rest is in a horizontal position, a pivotal mounting for said back rest whereby the same is movable from normal upright position to horizontal position intermediate the front and rear seats and vice versa, a second means operable in opposition to said first means for effecting curvature of the surface of the back rest when said back rest is in its normal upright position, said means being operable in an opposite direction to permit said first means to move the surface of said back rest to its flat condition when said back rest is in a horizontal position; a third means operable to move said seats and said back rest from their normal positions to horizontal positions and vice versa, and connecting means between said second and third means for retaining said second means in position to effect curvature of the surface of said back rest when said back rest is in its normal upright position, said connecting means being rendered ineffective when said back rest is moved to a horizontal position to permit said first means to move the surface of said back rest to its flat condition, the said seats and said back rest when in horizontal positions having aligned contiguous upper surfaces forming a substantially continuous horizontal surface of relatively large area.

2. In a passenger vehicle, normally rearwardly declining front and rear seats, a pivotal mounting for each of said seats whereby the seats are movable from their normal positions to horizontal positions and vice versa, a back rest for the front seat, constructed and arranged so that the surface thereof may assume either a curved contour or a flat condition, tension means connected to the surface of said back rest for urging said surface to assume its flat condition when said back rest is in a horizontal position, a pivotal mounting for said back rest whereby the same is movable from normal upright position to horizontal position intermediate the front and rear seats and vice versa, a pivoted cam associated with said back rest and operable in opposition to said tension means, said cam when in one position effecting curvature of the surface of the back rest when said back rest is in its normal, upright position and said cam, when in a second position permitting said tension means to move the surface of said back rest to its flat condition when said back rest is in horizontal position, operating means for moving said seats and back rest from their normal positions to horizontal positions and vice versa, and connecting means between said cam and said operating means for retaining said cam in position to effect curvature of the surface of said back rest when said back rest is in its normal, upright position, said connecting means being rendered ineffective when said back rest is moved to a horizontal position to permit said cam to be moved to its second position and permit said tension means to move the surface of the back rest to its flat condition, the said seats and said back rest when in horizontal positions having aligned, contiguous upper surfaces forming a substantially continuous horizontal surface of relatively large area.

3. In a passenger vehicle, normally rearwardly declining front and rear seats, a pivotal mounting for each of said seats whereby the seats are movable from their normal position to horizontal position and vice versa, a back rest for the front seat constructed and arranged so that the surface thereof may assume either a curved contour or a flat condition, a pivotal mounting for said back rest whereby the same is movable from normal upright position to horizontal position intermediate the front and rear seats and vice versa, manually operable means for moving the said seats and said back rest from their normal positions to horizontal position and vice versa, means for urging the surface of said back rest to assume its flat condition when said back rest is in a horizontal position, latchable means including a pivoted arm for maintaining the surface of said back rest in its curved contour when said back rest is in its normal upright position, and a latch for said pivoted arm releasable in response to movement of said back rest when said back rest is approaching a horizontal position, whereby the surface of said back rest is caused to assume automatically its flat condition when said back rest is in horizontal position, the said seats and said back rest when in horizontal position having aligned contiguous upper surfaces forming a substantially continuous horizontal surface of relatively large area.

4. In a passenger vehicle, normally rearwardly declining front and rear seats, a pivotal mounting for each of said seats whereby the seats are movable from their normal position to horizontal position and vice versa, a back rest for the front seat constructed and arranged so that the surface thereof may assume either a curved contour or a flat condition, a pivotal mounting for said back rest whereby the same is movable from normal upright position to horizontal position intermediate the front and rear seats and vice versa, manually operable means for moving the said seats and said back rest from their normal positions to horizontal position and vice versa, means for urging the surface of said back rest to assume its flat condition when said back rest is in a horizontal position, latchable means including a plurality of pivoted arms for maintaining the surface of the back rest in its curved contour when said back rest is in its normal upright position, and a latch for said arms releasable in response to movement of said back rest when said back rest is approaching a horizontal position, whereby the surface of said back rest is caused to assume automatically its flat condition when said back rest is in horizontal position, the said seats and said back rest when in horizontal position having aligned contiguous upper surfaces forming a substantially continuous horizontal surface of relatively large area, the said pivoted arms being constructed and arranged to support the back rest when the latter is in horizontal position.

5. In a passenger vehicle, normally rearwardly declining front and rear seats, a pivotal mounting for each of said seats whereby the seats are movable from their normal position to horizontal position and vice versa, a back rest for the front seat, a pivotal mounting for said back rest whereby the same is movable from normal upright position to horizontal position intermediate the front and rear seats and vice versa, manually operable means for moving the said seats and said back rest from their normal positions to horizontal position and vice versa, the said seats and said back rest when in horizontal position having aligned contiguous upper surfaces forming a substantially continuous horizontal surface of relatively large area, a sectional back rest for the rear seat including upper and lower sections, said upper section being movable away from said lower section to leave a space above the lower section, and said lower section being horizontally movable toward and from said rear seat and having a horizontal upper surface arranged for alignment with the upper surface of the rear seat when the latter is in horizontal position, and means for urging the lower section of said sectional back rest forwardly into snug engagement with said rear seat to thus effect and maintain a contiguous relation between the lower section of said sectional back rest section and rear seat when the latter is in horizontal position, the upper surface of the lower section of said sectional back rest thereby providing an extension to the horizontal surface formed by the upper surfaces of said seats and said front seat back rest.

6. In a passenger vehicle, normally rearwardly declining front and rear seats, a pivotal mounting for each of said seats whereby the seats are movable from their normal position to horizontal position and vice versa, a back rest for the front seat, a pivotal mounting for said back rest whereby the same is movable from normal upright position to horizontal position intermediate the front and rear seats and vice versa, manually operable means for moving said back rest to and from horizontal position, slotted brackets attached to the under surfaces of said seats, levers pivoted intermediate their ends below the seat and having their upper ends arranged for lateral movement in the slotted brackets, means connecting the opposite ends of said levers, and means operable by said first-mentioned means for rocking said levers on their pivots to move the free ends of said levers within said brackets, which movement causes said seats to move in unison to and from horizontal position simultaneously with the movement of said back rest, the said seats and said back rest when in horizontal position having aligned contiguous upper surfaces forming a substantially continuous horizontal surface of relatively large area.

7. In a passenger vehicle, normally rearwardly declining front and rear seats, a pivotal mounting for each of said seats whereby the seats are movable from their normal position to horizontal position and vice versa, a back rest for the front seat, a pivotal mounting for said back rest whereby the same is movable from normal upright position to horizontal position intermediate the front and rear seats and vice versa, manually operable means for moving said back rest to and from horizontal position, slotted brackets attached to the under surfaces of said seats, levers pivotally mounted intermediate their ends below the seats and having their upper ends arranged for lateral movement in the slotted brackets, means connecting the opposite ends of said levers, means operable by said first-mentioned means for rocking said levers on their pivots to move the free ends of said levers within said brackets, which movement causes said seats to move in unison to and from horizontal position simultaneously with the movement of said back rest, the said seats and said back rest when in horizontal position having aligned contiguous upper surfaces forming a substantially continuous horizontal surface of relatively large area, and springs in the slots of said brackets between the upper ends of the levers and one end of the slots and arranged to create tension on said levers and their associated parts when said back rest is in upright position, thereby preventing rattling of parts when the vehicle is in motion.

8. In a passenger vehicle, normally rearwardly declining front and rear seats, a pivotal mounting for each of said seats whereby the seats are movable from their normal positions to horizontal positions, and vice versa, a back rest for the front seat, a pivotal mounting for said back rest whereby the same is movable from normal upright position to horizontal position intermediate the front and rear seats and vice versa, manually operable means for moving said back rest to and from horizontal positions, levers pivoted intermediate their ends below the seats and having their upper ends below and in contact with said seats, means connecting the opposite ends of said levers, and means operable by said first mentioned means for rocking said levers on their pivots to move the upper ends thereof in an arc, which movement causes said seats to move to and from horizontal positions simultanequsly with the movement of said back rest, the said seats and said back rest when in horizontal position having aligned, contiguous upper surfaces forming a substantially continuous horizontal surface of relatively large area.

JUAN G. MATHÉ.
GEORGE W. HIPSLEY.